United States Patent
Barnett et al.

(10) Patent No.: US 12,192,559 B2
(45) Date of Patent: *Jan. 7, 2025

(54) SYSTEM AND METHOD FOR CONFIGURING CONTROLLING DEVICE FUNCTIONALITY

(71) Applicant: Universal Electronics Inc., Scottsdale, AZ (US)

(72) Inventors: Brian Barnett, Oakland, CA (US); Arsham Hatambeiki, San Diego, CA (US); Rex Xu, Tustin, CA (US); Jesus Perez, Costa Mesa, CA (US)

(73) Assignee: Universal Electronics Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/224,106

(22) Filed: Jul. 20, 2023

(65) Prior Publication Data

US 2023/0370670 A1 Nov. 16, 2023

Related U.S. Application Data

(63) Continuation of application No. 17/709,603, filed on Mar. 31, 2022, now Pat. No. 11,750,872, which is a
(Continued)

(51) Int. Cl.
*H04N 21/422* (2011.01)
*H04N 5/765* (2006.01)
(Continued)

(52) U.S. Cl.
CPC ....... *H04N 21/42204* (2013.01); *H04N 5/765* (2013.01); *H04N 5/775* (2013.01);
(Continued)

(58) Field of Classification Search
None
See application file for complete search history.

(56) References Cited

U.S. PATENT DOCUMENTS

| 4,626,848 A | 12/1986 | Ehlers |
| 4,703,359 A | 10/1987 | Rumbolt |

(Continued)

FOREIGN PATENT DOCUMENTS

| CN | 103179208 A | 6/2013 |
| CN | 103685746 A | 3/2014 |

(Continued)

OTHER PUBLICATIONS

Int. Searching Authority/US, Int. Search Report and Written Opinion of PCT Appln. No. US2012/54372, 15 pgs.

(Continued)

*Primary Examiner* — Samira Monshi
(74) *Attorney, Agent, or Firm* — Greenberg Traurig, LLP

(57) ABSTRACT

A controlling device is automatically configured to issue a communication directly to a first controllable appliance to control a functional operation of the first controllable appliance in the event that the first controllable appliance is determined to be unresponsive to a command communication transmitted to the first controllable appliance via a digital communications link or to issue a communication to a second controllable appliance to control the functional operation of the first controllable appliance via a digital communications link in the event that first controllable appliance is determined to be responsive to a command communication transmitted to the first controllable appliance via a digital communications link.

21 Claims, 6 Drawing Sheets

Related U.S. Application Data continuation of application No. 17/217,587, filed on Mar. 30, 2021, now Pat. No. 11,405,677, which is a continuation of application No. 15/455,411, filed on Mar. 10, 2017, now Pat. No. 11,006,165, which is a continuation of application No. 15/180,188, filed on Jun. 13, 2016, now Pat. No. 9,641,785, which is a continuation of application No. 14/676,556, filed on Apr. 1, 2015, now Pat. No. 9,380,250, which is a continuation of application No. 13/240,604, filed on Sep. 22, 2011, now Pat. No. 9,019,435.

(51) Int. Cl.
| | |
|---|---|
| H04N 5/775 | (2006.01) |
| H04N 21/4363 | (2011.01) |
| H04N 21/442 | (2011.01) |
| H04N 21/45 | (2011.01) |
| H04N 21/485 | (2011.01) |
| H04N 21/41 | (2011.01) |

(52) U.S. Cl.
CPC . *H04N 21/42216* (2013.01); *H04N 21/42227* (2013.01); *H04N 21/43635* (2013.01); *H04N 21/4424* (2013.01); *H04N 21/4516* (2013.01); *H04N 21/485* (2013.01); *H04N 21/41265* (2020.08); *H04N 21/4221* (2013.01); *H04N 21/42221* (2013.01)

(56) References Cited

U.S. PATENT DOCUMENTS

| | | | |
|---|---|---|---|
| 4,746,919 | A | 5/1988 | Reitmeier |
| 4,959,810 | A | 9/1990 | Darbee et al. |
| 4,998,292 | A | 3/1991 | Eigeldinger |
| 5,255,313 | A | 10/1993 | Darbee |
| 5,341,166 | A | 8/1994 | Garr |
| 5,410,326 | A | 4/1995 | Goldstein |
| 5,452,291 | A | 9/1995 | Eisenhandler |
| 5,481,256 | A | 1/1996 | Darbee et al. |
| 5,519,457 | A | 5/1996 | Nishigaki |
| 5,537,104 | A | 7/1996 | Van Dort |
| 5,552,917 | A | 9/1996 | Darbee |
| 5,614,906 | A | 3/1997 | Hayes |
| 5,689,663 | A | 11/1997 | Williams |
| 5,726,645 | A | 3/1998 | Kamon |
| 5,835,156 | A | 11/1998 | Blonstein |
| 5,839,097 | A | 11/1998 | Klausner |
| 5,889,506 | A | 3/1999 | Lopresti |
| 5,909,183 | A | 6/1999 | Borgstahl |
| 5,949,351 | A | 9/1999 | Hahm |
| 5,959,539 | A | 9/1999 | Adolph |
| 5,959,751 | A | 9/1999 | Darbee et al. |
| 5,990,884 | A | 11/1999 | Douma |
| 6,005,490 | A | 12/1999 | Higashihara |
| 6,008,735 | A | 12/1999 | Chiloyan |
| 6,014,092 | A | 1/2000 | Darbee et al. |
| 6,097,441 | A | 8/2000 | Allport |
| 6,127,961 | A | 10/2000 | Stacy |
| 6,133,847 | A | 10/2000 | Yang |
| 6,148,241 | A | 11/2000 | Ludtke |
| 6,157,319 | A | 12/2000 | Johns |
| 6,160,491 | A | 12/2000 | Kitao |
| 6,177,931 | B1 | 1/2001 | Alexander |
| 6,208,341 | B1 | 3/2001 | Van Ee |
| 6,208,384 | B1 | 3/2001 | Schultheiss |
| 6,211,870 | B1 | 4/2001 | Foster |
| 6,225,938 | B1 | 5/2001 | Hayes et al. |
| 6,259,892 | B1 | 7/2001 | Helferich |
| 6,344,817 | B1 | 2/2002 | Verzulli |
| 6,473,099 | B1 | 10/2002 | Goldman |
| 6,529,556 | B1 | 3/2003 | Perdue |
| 6,567,011 | B1 | 5/2003 | Young |
| 6,597,374 | B1 | 7/2003 | Baker |
| 6,633,281 | B2 | 10/2003 | Lin |
| 6,650,248 | B1 | 11/2003 | O'Donnell |
| 6,665,020 | B1 | 12/2003 | Stahl |
| 6,690,392 | B1 | 2/2004 | Wugoski |
| 6,724,339 | B2 | 4/2004 | Conway |
| 6,748,278 | B1 | 6/2004 | Maymudes |
| 6,781,518 | B1 | 8/2004 | Hayes |
| 6,791,467 | B1 | 9/2004 | Ben-Ze'ev |
| 6,795,130 | B2 | 9/2004 | Shibamiya |
| 6,826,699 | B1 | 11/2004 | Sun |
| 6,850,252 | B1 | 2/2005 | Hoffberg |
| 6,909,378 | B1 | 6/2005 | Lambrechts |
| 6,940,562 | B2 | 9/2005 | Sato |
| 6,947,101 | B2 | 9/2005 | Arling |
| 6,968,399 | B2 | 11/2005 | Noda |
| 6,971,072 | B1 | 11/2005 | Stein |
| 6,980,150 | B2 | 12/2005 | Conway, Jr. |
| 7,013,434 | B2 | 3/2006 | Masters |
| 7,046,161 | B2 | 5/2006 | Hayes |
| 7,136,709 | B2 | 11/2006 | Arling et al. |
| 7,154,566 | B2 | 12/2006 | Gustafson |
| 7,254,777 | B2 | 8/2007 | Hayes |
| 7,259,696 | B1 | 8/2007 | Lee |
| 7,271,732 | B2 | 9/2007 | Harada |
| 7,375,673 | B2 | 5/2008 | Spilo |
| 7,379,778 | B2 | 5/2008 | Hayes |
| 7,429,932 | B1 | 9/2008 | Newell |
| 7,436,346 | B2 | 10/2008 | Walter |
| 7,519,393 | B2 | 4/2009 | Bahl |
| 7,554,614 | B2 | 6/2009 | Satou |
| 7,562,128 | B1 | 7/2009 | Caris |
| 7,589,642 | B1 | 9/2009 | Mui |
| 7,671,758 | B1 | 3/2010 | Seidel |
| 7,768,421 | B2 | 8/2010 | Suzuki et al. |
| 7,827,319 | B2 | 11/2010 | Kimura et al. |
| 7,831,930 | B2 | 11/2010 | Dresti |
| 7,907,222 | B2 | 3/2011 | Haughawout |
| 7,936,287 | B1 | 5/2011 | Lee |
| 7,944,370 | B1 | 5/2011 | Harris |
| 7,969,514 | B2 | 6/2011 | Haughawout et al. |
| 8,040,888 | B1 | 10/2011 | Macadam |
| 8,068,184 | B2 | 11/2011 | Hicks |
| 8,098,337 | B2 | 1/2012 | Martch |
| 8,132,105 | B1 | 3/2012 | Dubil |
| 8,179,404 | B2 | 5/2012 | Nagatomo |
| 8,189,120 | B2 | 5/2012 | Doyle |
| 8,199,258 | B2 | 6/2012 | Tokoro |
| 8,203,436 | B2 | 6/2012 | Ikeda |
| 8,260,975 | B1 | 9/2012 | Schanin |
| 8,269,892 | B2 | 9/2012 | Asada |
| 8,342,915 | B1 | 1/2013 | Vogel et al. |
| 8,373,556 | B2 | 2/2013 | Lalonde |
| 8,429,713 | B2 | 4/2013 | Candelore |
| 8,477,179 | B2 | 7/2013 | Tatsuta |
| 8,508,401 | B1 | 8/2013 | Patel |
| 8,509,400 | B2 | 8/2013 | Liu |
| 8,633,986 | B1 | 1/2014 | Hughes |
| 8,704,698 | B2 | 4/2014 | Park |
| 8,810,732 | B1 | 8/2014 | Bozarth |
| 8,839,334 | B2 | 9/2014 | Lee |
| 8,854,192 | B1 | 10/2014 | Harris |
| 8,854,556 | B2 | 10/2014 | Haughawout |
| 8,881,205 | B2 | 11/2014 | Friedman |
| 8,995,981 | B1 | 3/2015 | Aginsky |
| 9,019,435 | B2 | 4/2015 | Barnett et al. |
| 9,047,761 | B2 | 6/2015 | Haughawout |
| 9,088,663 | B2 | 7/2015 | Arling |
| 9,098,868 | B1 | 8/2015 | Issa |
| 9,123,236 | B2 | 9/2015 | Haughawout |
| 9,239,837 | B2 | 1/2016 | Chardon |
| 9,350,850 | B2 | 5/2016 | Pope |
| 9,451,306 | B2 | 9/2016 | Sarukkai |
| 9,489,835 | B2 | 11/2016 | Haughawout |
| 9,554,061 | B1 | 1/2017 | Proctor, Jr. |
| 9,599,981 | B2 | 3/2017 | Crabtree |
| 9,648,358 | B2 | 5/2017 | Ellis |
| 9,792,133 | B2 | 11/2017 | Lee et al. |
| 9,852,615 | B2 | 12/2017 | Perez |
| 9,978,263 | B2 | 5/2018 | Haughawout |

(56) References Cited

U.S. PATENT DOCUMENTS

| | | |
|---|---|---|
| 10,074,364 B1 | 9/2018 | Wightman |
| 10,217,352 B2 | 2/2019 | Arling |
| 10,397,749 B1 | 8/2019 | Barua |
| 10,553,106 B2 | 2/2020 | Jeon |
| 10,593,196 B2 | 3/2020 | Arling |
| 10,600,317 B2 | 3/2020 | Haughawout |
| 10,902,716 B2 | 1/2021 | Perez |
| 11,398,148 B2 | 7/2022 | Perez |
| 11,716,458 B2 | 8/2023 | Marino |
| 2001/0005197 A1 | 6/2001 | Mishra |
| 2001/0043145 A1 | 11/2001 | James, Jr. |
| 2002/0124249 A1 | 9/2002 | Shintani |
| 2002/0140569 A1 | 10/2002 | Van Ee |
| 2002/0158771 A1 | 10/2002 | Mears |
| 2002/0174270 A1 | 11/2002 | Stecyk |
| 2002/0194299 A1 | 12/2002 | Yasaki |
| 2002/0194596 A1 | 12/2002 | Srivastava |
| 2003/0028761 A1 | 2/2003 | Platt |
| 2003/0095156 A1 | 5/2003 | Klein |
| 2003/0095211 A1 | 5/2003 | Nakajima |
| 2003/0103088 A1 | 6/2003 | Dresti |
| 2003/0115599 A1 | 6/2003 | Bennington |
| 2003/0122698 A1 | 7/2003 | Horie |
| 2003/0141987 A1 | 7/2003 | Hayes |
| 2003/0163542 A1 | 8/2003 | Bulthuis |
| 2003/0189509 A1 | 10/2003 | Hayes |
| 2004/0010327 A1 | 1/2004 | Terashima |
| 2004/0056789 A1 | 3/2004 | Arling |
| 2004/0070491 A1 | 4/2004 | Huang |
| 2004/0075602 A1 | 4/2004 | Griesau |
| 2004/0078822 A1 | 4/2004 | Breen |
| 2004/0113892 A1 | 6/2004 | Mears |
| 2004/0143847 A1 | 7/2004 | Suzuki |
| 2004/0148632 A1 | 7/2004 | Park |
| 2004/0163073 A1 | 8/2004 | Krzyzanowski |
| 2004/0203387 A1 | 10/2004 | Grannan |
| 2004/0210933 A1 | 10/2004 | Dresti |
| 2004/0228605 A1 | 11/2004 | Quan |
| 2004/0235463 A1 | 11/2004 | Patel |
| 2004/0255329 A1 | 12/2004 | Compton |
| 2004/0257239 A1 | 12/2004 | Griesau |
| 2004/0266419 A1 | 12/2004 | Arling |
| 2005/0028208 A1 | 2/2005 | Ellis |
| 2005/0052423 A1 | 3/2005 | Harris et al. |
| 2005/0068222 A1 | 3/2005 | Krzyzanowski |
| 2005/0076153 A1 | 4/2005 | Nedellec |
| 2005/0097618 A1 | 5/2005 | Arling |
| 2005/0110651 A1 | 5/2005 | Martis |
| 2005/0151726 A1 | 7/2005 | Wouters |
| 2005/0154787 A1 | 7/2005 | Cochran |
| 2005/0159823 A1 | 7/2005 | Hayes |
| 2005/0160468 A1 | 7/2005 | Rodriguez et al. |
| 2005/0195823 A1 | 9/2005 | Chen |
| 2005/0210498 A1 | 9/2005 | Scott, III |
| 2005/0220194 A1 | 10/2005 | Compton |
| 2005/0221792 A1 | 10/2005 | Mattisson |
| 2005/0243057 A1 | 11/2005 | Sugiyama |
| 2005/0273817 A1 | 12/2005 | Rodriguez |
| 2006/0007015 A1 | 1/2006 | Krzyzanowski |
| 2006/0044175 A1 | 3/2006 | Choi |
| 2006/0080408 A1 | 4/2006 | Istvan |
| 2006/0080707 A1 | 4/2006 | Laksono |
| 2006/0095401 A1 | 5/2006 | Krikorian |
| 2006/0095596 A1 | 5/2006 | Yung et al. |
| 2006/0146184 A1 | 7/2006 | Gillard |
| 2006/0150123 A1 | 7/2006 | Goodwin et al. |
| 2006/0156109 A1 | 7/2006 | Kojima |
| 2006/0168618 A1 | 7/2006 | Choi |
| 2006/0197753 A1 | 9/2006 | Hotelling |
| 2006/0200538 A1 | 9/2006 | Yuh |
| 2006/0227032 A1 | 10/2006 | Alberto |
| 2006/0245725 A1 | 11/2006 | Lim |
| 2006/0263091 A1 | 11/2006 | Shimizu |
| 2006/0271997 A1 | 11/2006 | Jacoby |
| 2007/0052547 A1 | 3/2007 | Haughawout |
| 2007/0063860 A1 | 3/2007 | Escobosa |
| 2007/0063862 A1 | 3/2007 | Lippincott |
| 2007/0130607 A1 | 6/2007 | Thissen |
| 2007/0165555 A1 | 7/2007 | Deng |
| 2007/0220150 A1 | 9/2007 | Garg |
| 2007/0225828 A1 | 9/2007 | Huang |
| 2007/0229465 A1 | 10/2007 | Sakai |
| 2007/0268360 A1 | 11/2007 | Ahlgren |
| 2007/0288610 A1 | 12/2007 | Saint Clair |
| 2007/0288932 A1 | 12/2007 | Horvitz |
| 2007/0292135 A1 | 12/2007 | Guo |
| 2008/0004954 A1 | 1/2008 | Horvitz |
| 2008/0005764 A1 | 1/2008 | Arling |
| 2008/0007616 A1 | 1/2008 | Baladhandayuthapani |
| 2008/0044006 A1 | 2/2008 | Kitagawa |
| 2008/0046919 A1 | 2/2008 | Carmi |
| 2008/0098426 A1 | 4/2008 | Candelore |
| 2008/0120673 A1 | 5/2008 | Dong |
| 2008/0126591 A1 | 5/2008 | Kwon |
| 2008/0134237 A1 | 6/2008 | Tu et al. |
| 2008/0139181 A1 | 6/2008 | Lokshin |
| 2008/0141316 A1 | 6/2008 | Igoe |
| 2008/0155071 A1 | 6/2008 | Lindstrom |
| 2008/0168519 A1 | 7/2008 | Rao |
| 2008/0187028 A1 | 8/2008 | Lida |
| 2008/0195857 A1 | 8/2008 | Douillet |
| 2008/0221715 A1 | 9/2008 | Krzyzanowski |
| 2008/0231762 A1 | 9/2008 | Hardacker et al. |
| 2008/0244097 A1 | 10/2008 | Candelore et al. |
| 2008/0247544 A1 | 10/2008 | Candelore |
| 2008/0278567 A1 | 11/2008 | Nakajima |
| 2008/0319852 A1 | 12/2008 | Gardner |
| 2008/0320531 A1 | 12/2008 | Kim |
| 2008/0320542 A1 | 12/2008 | Guzman |
| 2009/0015723 A1 | 1/2009 | Doumuki |
| 2009/0031419 A1 | 1/2009 | Laksono |
| 2009/0040091 A1 | 2/2009 | Carlson |
| 2009/0051824 A1 | 2/2009 | Satou |
| 2009/0079813 A1 | 3/2009 | Hildreth |
| 2009/0092397 A1 | 4/2009 | Taguchi |
| 2009/0094645 A1 | 4/2009 | Ting |
| 2009/0106785 A1 | 4/2009 | Pharn |
| 2009/0113478 A1 | 4/2009 | Haughawout |
| 2009/0115723 A1 | 5/2009 | Henty |
| 2009/0121905 A1 | 5/2009 | Griffin, Jr. |
| 2009/0156051 A1 | 6/2009 | Doyle |
| 2009/0156251 A1 | 6/2009 | Cannistraro |
| 2009/0157198 A1 | 6/2009 | Morikawa |
| 2009/0167555 A1 | 7/2009 | Kohanek |
| 2009/0172746 A1 | 7/2009 | Aldrey |
| 2009/0195407 A1 | 8/2009 | Nakano et al. |
| 2009/0207039 A1 | 8/2009 | Haijima |
| 2009/0239587 A1 | 9/2009 | Negron |
| 2009/0248909 A1 | 10/2009 | Hironaka |
| 2009/0254500 A1 | 10/2009 | Stecyk |
| 2009/0254778 A1 | 10/2009 | Huang |
| 2009/0265163 A1 | 10/2009 | Lehmann et al. |
| 2009/0284656 A1 | 11/2009 | Suzuki |
| 2009/0289829 A1 | 11/2009 | Maier |
| 2009/0296731 A1 | 12/2009 | Lida |
| 2009/0298535 A1 | 12/2009 | Klein |
| 2010/0013998 A1 | 1/2010 | Mortensen |
| 2010/0014834 A1 | 1/2010 | Flynn |
| 2010/0034522 A1 | 2/2010 | Ng |
| 2010/0037264 A1 | 2/2010 | Hardacker |
| 2010/0039282 A1 | 2/2010 | Hostage |
| 2010/0043046 A1 | 2/2010 | Sen |
| 2010/0052843 A1 | 3/2010 | Cannistraro |
| 2010/0079682 A1 | 4/2010 | Martch |
| 2010/0118193 A1 | 5/2010 | Boyden et al. |
| 2010/0131682 A1 | 5/2010 | Huang |
| 2010/0134317 A1 | 6/2010 | Breuil |
| 2010/0135279 A1 | 6/2010 | Petersson et al. |
| 2010/0138764 A1 | 6/2010 | Hatambeiki |
| 2010/0149017 A1 | 6/2010 | Besshi |
| 2010/0153990 A1 | 6/2010 | Ress |
| 2010/0157169 A1 | 6/2010 | Yoshida et al. |
| 2010/0177245 A1 | 7/2010 | Ohnuma |
| 2010/0182236 A1 | 7/2010 | Pryor |

(56) References Cited

U.S. PATENT DOCUMENTS

| | | |
|---|---|---|
| 2010/0194983 A1 | 8/2010 | Iguchi |
| 2010/0228611 A1 | 9/2010 | Shenfield |
| 2010/0271560 A1 | 10/2010 | Higuchi |
| 2010/0296558 A1 | 11/2010 | Matsushita et al. |
| 2010/0315279 A1 | 12/2010 | Hamai |
| 2010/0328547 A1 | 12/2010 | Mayorga |
| 2011/0074591 A1 | 3/2011 | Arling et al. |
| 2011/0102230 A1 | 5/2011 | Vergis |
| 2011/0122317 A1 | 5/2011 | Chen |
| 2011/0125301 A1 | 5/2011 | Inoue et al. |
| 2011/0138327 A1 | 6/2011 | Scott |
| 2011/0142059 A1 | 6/2011 | Bedingfield, Sr. |
| 2011/0156944 A1 | 6/2011 | Ward |
| 2011/0179149 A1 | 7/2011 | Kazan |
| 2011/0181386 A1 | 7/2011 | Lee |
| 2011/0187928 A1 | 8/2011 | Crabtree |
| 2011/0273287 A1 | 11/2011 | Lalonde |
| 2011/0273625 A1 | 11/2011 | McMahon et al. |
| 2011/0274008 A1 | 11/2011 | Lida |
| 2011/0283129 A1 | 11/2011 | Guillerm |
| 2011/0285818 A1 | 11/2011 | Park |
| 2011/0289113 A1 | 11/2011 | Arling |
| 2011/0291971 A1 | 12/2011 | Masaki et al. |
| 2011/0302619 A1 | 12/2011 | Hale et al. |
| 2011/0314153 A1 | 12/2011 | Bathiche |
| 2012/0013449 A1 | 1/2012 | Penisoara |
| 2012/0013807 A1 | 1/2012 | Arora |
| 2012/0019400 A1 | 1/2012 | Patel |
| 2012/0019633 A1 | 1/2012 | Holley |
| 2012/0021684 A1 | 1/2012 | Schultz et al. |
| 2012/0025957 A1 | 2/2012 | Yang |
| 2012/0050310 A1 | 3/2012 | Patel |
| 2012/0062805 A1 | 3/2012 | Candelore |
| 2012/0069246 A1 | 3/2012 | Thornberry |
| 2012/0069894 A1 | 3/2012 | Sakimura |
| 2012/0082461 A1 | 4/2012 | Meyer |
| 2012/0084452 A1 | 4/2012 | Pettit |
| 2012/0084662 A1 | 4/2012 | Navarro |
| 2012/0086869 A1 | 4/2012 | Friedlander |
| 2012/0105721 A1 | 5/2012 | Huang |
| 2012/0131245 A1 | 5/2012 | Wilcox |
| 2012/0133841 A1 | 5/2012 | Vanderhoff |
| 2012/0144416 A1 | 6/2012 | Wetzer |
| 2012/0146918 A1 | 6/2012 | Kreiner |
| 2012/0171958 A1 | 7/2012 | Cornett |
| 2012/0173003 A1 | 7/2012 | Kim |
| 2012/0185580 A1 | 7/2012 | Detert |
| 2012/0196536 A1 | 8/2012 | Koo |
| 2012/0236161 A1 | 9/2012 | Kwon |
| 2012/0242526 A1 | 9/2012 | Perez |
| 2012/0249890 A1 | 10/2012 | Chardon |
| 2012/0274547 A1 | 11/2012 | Raeber |
| 2012/0274857 A1 | 11/2012 | Maxwell |
| 2012/0274863 A1 | 11/2012 | Chardon et al. |
| 2012/0278693 A1 | 11/2012 | Black |
| 2012/0284758 A1 | 11/2012 | Adjesson |
| 2012/0291128 A1 | 11/2012 | Jayawardena |
| 2012/0297040 A1 | 11/2012 | Amano |
| 2012/0330943 A1 | 12/2012 | Weber |
| 2013/0005250 A1 | 1/2013 | Kim |
| 2013/0057774 A1 | 3/2013 | Yoshida |
| 2013/0058522 A1 | 3/2013 | Raesig |
| 2013/0069769 A1 | 3/2013 | Pennington et al. |
| 2013/0085851 A1 | 4/2013 | Pedro |
| 2013/0106977 A1 | 5/2013 | Chu |
| 2013/0107131 A1 | 5/2013 | Barnett |
| 2013/0198005 A1 | 8/2013 | Xiong |
| 2013/0249679 A1 | 9/2013 | Arling |
| 2013/0258918 A1 | 10/2013 | Rudland |
| 2013/0265248 A1 | 10/2013 | Nagahara |
| 2013/0276010 A1 | 10/2013 | Drayson |
| 2013/0298147 A1 | 11/2013 | Klein |
| 2013/0304817 A1 | 11/2013 | Hu |
| 2014/0085059 A1 | 3/2014 | Chen |
| 2014/0115631 A1 | 4/2014 | Mak |
| 2014/0157305 A1 | 6/2014 | Del Sordo |
| 2014/0222861 A1 | 8/2014 | Arling |
| 2014/0235526 A1 | 8/2014 | Srivastava |
| 2014/0279047 A1 | 9/2014 | Wang |
| 2014/0337879 A1 | 11/2014 | Arling |
| 2015/0032541 A1 | 1/2015 | Haddad |
| 2015/0187206 A1 | 7/2015 | Saurin |
| 2015/0289030 A1 | 10/2015 | Roberts |
| 2016/0017585 A1 | 1/2016 | Plate |
| 2016/0057537 A1 | 2/2016 | Robinson |
| 2016/0125733 A1 | 5/2016 | Sallas |
| 2016/0173961 A1 | 6/2016 | Coan |
| 2017/0024119 A1 | 1/2017 | Wild |
| 2017/0168595 A1 | 6/2017 | Sakaguchi |
| 2017/0205783 A1 | 7/2017 | Tannenbaum |
| 2017/0279497 A1 | 9/2017 | Schultz et al. |
| 2017/0289484 A1 | 10/2017 | Arling |
| 2018/0130469 A1 | 5/2018 | Gruenstein |
| 2018/0211651 A1 | 7/2018 | Hall |
| 2019/0033446 A1 | 1/2019 | Bultan |
| 2019/0261043 A1 | 8/2019 | Sato |
| 2019/0287525 A1 | 9/2019 | Kim |
| 2019/0379887 A1 | 12/2019 | Marino |
| 2020/0092641 A1 | 3/2020 | Smus |
| 2020/0204613 A1 | 6/2020 | Hatambeiki |
| 2021/0120301 A1 | 4/2021 | Xu |
| 2021/0368562 A1 | 11/2021 | Hatambeiki |
| 2022/0030296 A1 | 1/2022 | Satheesh |
| 2022/0051554 A1 | 2/2022 | Tchedikian |
| 2022/0053230 A1 | 2/2022 | Tchedikian |
| 2022/0109669 A1 | 4/2022 | Yuh |
| 2022/0294639 A1 | 9/2022 | Amsalem |
| 2023/0106761 A1 | 4/2023 | Coffman |

FOREIGN PATENT DOCUMENTS

| | | |
|---|---|---|
| CN | 101910960 A | 6/2014 |
| CN | 102541547 B | 12/2015 |
| CN | 103999137 A | 4/2017 |
| DE | 197098002 A1 | 9/1998 |
| EP | 0513443 B1 | 11/1999 |
| EP | 1722341 A1 | 11/2006 |
| EP | 2265003 A2 | 12/2010 |
| EP | 3084744 A1 | 10/2016 |
| EP | 1489575 B1 | 7/2017 |
| EP | 2490195 B1 | 4/2022 |
| GB | 2166328 A | 6/1989 |
| JP | 05083765 A | 7/2009 |
| JP | 2010034853 A | 2/2010 |
| JP | 2013085225 A | 5/2013 |
| KR | 10-2011-0051788 | 5/2011 |
| KR | 10-2013-0070764 | 6/2013 |
| WO | 8911137 W | 11/1989 |
| WO | 9732290 | 9/1997 |
| WO | 0013344 A1 | 3/2000 |
| WO | 0017738 | 3/2000 |
| WO | 0034851 | 6/2000 |
| WO | 0039772 | 7/2000 |
| WO | 0147130 | 6/2001 |
| WO | 03044684 | 5/2003 |
| WO | 03044756 W | 5/2003 |
| WO | 0383801 | 10/2003 |
| WO | 0451592 | 6/2004 |
| WO | 05036325 | 4/2005 |
| WO | 2007105142 A1 | 9/2007 |
| WO | 2011053008 A2 | 5/2011 |
| WO | 2015095637 A1 | 6/2015 |
| WO | 2016126609 A2 | 8/2016 |
| WO | 2018198036 A1 | 11/2018 |
| WO | 2018224812 A1 | 12/2018 |
| WO | 2019236764 A1 | 12/2019 |
| WO | 2020172134 A1 | 8/2020 |
| WO | 2020232336 A1 | 11/2020 |

OTHER PUBLICATIONS

Brazilian Patent Office, Office Action issued on Brazilian patent application No. BR1120140069263, 2 pgs.

(56) References Cited

OTHER PUBLICATIONS

"Data Formats for IR Remote Controls," Vishay Semiconductors, Document No. 80071, Rev. A2, (Aug. 27, 2003), 5 pp.
2010 Spring BD-Players, BOP IP & RS-232 Control Version 1. 00. 00, Edited Dec. 8, 2010 {"Remote Code Commands Lisi") https://www.pioneerelectronics.com/SlaticFiles/PUSA/Files/Home%20Custom%20In ,tall/2010%20Pioneer/o20BDP330_IP &_RS-232_ Commands.pdf), 3 pp.
AT2400 AllTouch Remote Control User's Guide, Scientific Atlanta Inc., (2002), 2 pp.
Commission Decision in ITC-337-TA-1200, 45 pp.
Connecting the Explorer 8300HDTM Digital Video Recorder Manual, Scientific Atlantic Inc. (2005), 27 pp.
Declaration of Samuel H. Russ, PhD, 100 pp.
Expert Report of Dr. Craig Rosenberg from ITC-337-TA-1200 dated Nov. 19, 2020 (Redacted Relevant Pages—Non Confidential Version), 9 pp.
Extended European search report issued of European patent application No. 19871693.8 dated Jun. 14, 2022, 10 pages.
Extended European Search Report issued on European patent application No. 19908998.8, dated Sep. 27, 2022, 10 pages.
Extended European search report issued on European patent application No. 20909517.3, dated Jan. 5, 2022, 10 pages.
Extended European search report issued on European patent application No. 20910756.4, dated Dec. 20, 2022, 11 pages.
Extended European Search Report issued on European patent application No. 21217138.3, dated Apr. 7, 2022, 12 pages.
File History of U.S. Pat. No. 10,600,317 to Haughawout.
Infrared Data Association Serial Infrared Physical Layer Specification, Version 1.4, May 30, 2001, 1994, Infrared Data Association, 68 pgs.
Initial Determination in ITC-337-TA-1200, 154 pp.
Int. Search Report and Written Opinion issued on PCT application No. PCT/US22/33028, dated Oct. 14, 2022, 20 pages.
International CES 2000 Report—Universal Electronics Inc. (2000) http://www.remotecentral.com/ces2000/uei.hlm), 2 pp.
ITC Commission Opinion, Inv. No. 337-TA-1200, issued Dec. 3, 2021, 46 pp.
ITC Markman Order, Inv. No. 337-TA-1200, filed Oct. 1, 2020.
Logitech Harmony 900 Universal Remote Review, by David Rees, The Gadgeteer, User Review 2 (hllps://the-gadgeteer.com/2010/01/25/logitech-harmony-900-universal-remotereview/), 16 pp.
Michael Brown, Product Reviews—Logitech Harmony 900 Review, User Review 1 Sep. 14, 2009) {https://www.digitaltrends.com/gadget-reviews/logitech-harmony-900-review/), 18 pp.
Non-final Office Action from U.S. Appl. No. 17/686,039, mailed May 10, 2023, 14 pp.
Non-Final Office Action issued in U.S. Appl. No. 17/461,237, dated Aug. 17, 2022, 8 pgs.
Non-Final Office Action issued in U.S. Appl. No. 17/665,219, dated Feb. 16, 2023, 10 pgs.
Non-Final Office Action issued on U.S. Appl. No. 16/114,762, Notification Date of Feb. 14, 2020, 13 pgs.
Non-Final Office Action issued on U.S. Appl. No. 16/540,635, Notification Date of Feb. 24, 2020, 11 pgs.
Non-Final Office Action issued on U.S. Appl. No. 16/778,638, Notification Date of Mar. 6, 2020, 8 pgs.
Non-Final Office Action issued on U.S. Appl. No. 17/375,566, dated Jan. 21, 2022, 19 pgs.
Non-Final Office Action issued on U.S. Appl. No. 17/527,532, dated Feb. 10, 2022, 10 pgs.
Office action issued on Brazilian patent application No. BR112014010028-4, dated May 17, 2022, 7 pages.
Office Action issued on U.S. Appl. No. 17/527,390, dated Feb. 3, 2022, 6 pgs.
Patent Owner Infringement Claim Chart of U.S. Pat. No. 10,593,196 marked Ex. 5 in ITC-337-TA-1200 (Redacted Relevant Pages—Non Confidential Version), 9 pp.
Patent Owners Preliminary Response in IPR2021-00299, 63 pp.
Prosecution History of U.S. Pat. No. 10,593,196 to Arling, 459 pp.
Transcript of the Sep. 30, 2020 Deposition of Dr. Turnbull, 166 pp.
U.S. Appl. No. 61/680,876 to Arling et al.
United States Court of Appeals for the Federal Circuit, In re: Universal Electronics, Inc., 2022-1757, Opinion filed for the court by Reyna, Taranto, and Stoll, Circuit Judges, Nonprecedential Opinion. Date entered/, 4 pgs.
Universal Electronics Inc., "Universal Electronics Teams Up with Sensory to Deliver Smart Home Digital Assistant Platform with Embedded Voice Control and Branded Assistant Experience." Jan. 4, 2019 {Jan. 4, 2019) Retrieved on Aug. 19, 2022 {Aug. 19, 2022) from <https://universalelectronicsinc.gcs-web.com/news-releases/newsrelease-details/universal-electronics-teams-sensory-deliver-smart-home-digital>, 2 pp.
Office action issued on Korean patent application No. 10-2017-7024670, mailed May 24, 2022, 11 pages.
Extended European Search Report issued on European patent application No. 12765455.6, dated Aug. 5, 2014, 9 pages.
Final Office Action from U.S. Appl. No. 17/524,777, dated Apr. 24, 2023, 18 pp.
Final Office Action issued on U.S. Appl. No. 15/900,232, dated Dec. 13, 2018, 15 pages.
International Search Report and Written Opinion, issued in Appln. No. PCT/US12/62161, dated Jan. 18, 2013, 12 pgs.
Non-final Office Action from U.S. Appl. No. 17/686,039, dated Jan. 4, 2024, 11 pp.
Non-Final Office Action issued in U.S. Appl. No. 17/186,156, dated Aug. 4, 2022, 14 pgs.
Non-Final Office Action issued on U.S. Appl. No. 16/197,748, Notification Date of Sep. 6, 2019, 9 pp.
Preliminary Report on Patentability issued on PCT/US12/027841, 7 pgs.
China National Intellectual Property Administration, Second Office Action issued in CN App. No. 201480057944.0, Dated Jul. 16, 2019, 21 pgs.
Digital Video Recorder with TiVo, Spring and Fall 2001, Service Update Guide, 65 pgs.
Direct TV TiVo Installation Guide, Hughes Network Systems, 68 pgs.
EPO, examination report issued on European patent application No. 14801064.8, dated Jul. 11, 2019, 4 pages.
ETSI TS 102 006 v1 .3.1, (May 2004), Technical Specification, Digital Video Broadcasting (DVB); Specification for System Software Update in DVB Systems, European Broadcasting Union, 39 pgs.
European Patent Office, extended European Search Report issued on European patent application No. 12844121.9, dated Mar. 5, 2015, 6 pages.
European Patent Office, extended European Search Report issued on European patent application No. 14801064.8, dated Apr. 18, 2016, 8 pages.
European Patent Office, extended European Search Report issued on European patent application No. 14872863.7, dated Nov. 25, 2016, 8 pages.
Final Office Action issued on U.S. Appl. No. 16/199,463, Notification Date of May 6, 2020, 14 pgs.
Final Office Action issued on U.S. Appl. No. 16/778,638, Notification date of Jul. 23, 2020, 6 pgs.
Final Office Action issued on U.S. Appl. No. 15/900,342, dated Nov. 29, 2018, 19 pages.
HDMI Specification Version 1.3a, Hitachi, Lid., et al., Nov. 10, 2006, 2001-2006 by Hitachi, Lid., et al., 276 pgs.
High-Definition Multimedia Interface, HDMI Licensing, LLC, Specification Version 1.3a, Nov. 10, 2006, pp. 1-276.
In re reexam of U.S. Pat. No. 10,600,317 to Haughawout et al., For System and Method for Simplified SetUp of a Universal Remote Control, Declaration of Mr. John Tinsman Under 37 C.F.R. § 1.132, 121 pgs.
Int. Search Report and Written Opinion of the Int. Searching Authority issued on Int. Appln. No. PCT/US12/62161, 12 pages.
Int. Search Report and Written Opinion of the Int. Searching Authority issued on Int. Appln. No. PCT/US14/38151, 9 pages.
International Search Report and Written Opinion issued on PCT application No. US19/54315, dated Jan. 2, 2020, 16 pages.

(56) References Cited

OTHER PUBLICATIONS

ISA/KR, Int'l Search Report issued in Appln. No. PCT/US12/60390, dated Jul. 18, 2013, 4 pgs.
ISA/KR, Written Opinion issued in Appln. No. PCT/US12/60390, dated Jul. 18, 2013, 7 pgs.
VCR CommanderTM Service User's Guide, Scientific—Atlanta Inc. (2000), 28 pp.
User Manual Harmony 900—Remote Control User Guide, Version 1.0, Logitech, 59 pp.
Logitech Unveils Harmony 680 Remote: Maestro of the Living Room Media Center PC, Logitech NASDAQ:LOGI, 4 pgs.
Non-final Office Action from U.S. Appl. No. 17/686,180, mailed May 23, 2023, 13 pp.
Non-Final Office Action issued on U.S. Appl. No. 16/156,766, Notification Date of Oct. 4, 2019, 10 pgs.
Non-Final Office Action issued on U.S. Appl. No. 16/196,756, Notification Date of Sep. 6, 2019, 9 pgs.
Non-Final Office Action issued on U.S. Appl. No. 16/197,552, Notification Date of Sep. 19, 2019, 10 pgs.
Non-Final Office Action issued on U.S. Appl. No. 16/197,748, Notification Date of Sep. 6, 2019, 9 pgs.
Non-Final Office Action issued on U.S. Appl. No. 16/457,309, Notification Date of Mar. 6, 2020, 17 pgs.
Non-Final Office Action issued on U.S. Appl. No. 16/783,971, Dated Sep. 2, 2020, 8 pgs.
Non-Final Office Action issued on U.S. Appl. No. 16/814,493, dated Feb. 19, 2021, 15 pgs.
Non-Final Office Action issued on U.S. Appl. No. 16/838,736 dated Mar. 18, 2021, 15 pgs.
Norme Internationale International Standard, CEI IEC 61883-1, First edition, Feb. 1998, Consumer audio/video equipment—Digital interface—Part 1 :General, Copyright International Electrotechnical Commission, Ref. No. EI/IEC 61883-1:1998, Order No. W2248667, 100 pgs.
Notice of Allowance issued in U.S. Appl. No. 17/665,219, dated May 16, 2023, 6 pgs.
Personal TV Owner's Guide, TiVo, Philips, 1999 by TiVo, Inc., USA, 153 pgs.
Petition for Inter Partes Review of U.S. Pat. No. 10,600,317, Case No. IPR2021-00263, *ROKU, Inc.* v. *UEI, Inc.*, 94 pp.
Petition for Inter Partes Review of U.S. Pat. No. 10,600,317, Case No. IPR2021-00264, *ROKU, Inc.* v. *UEI, Inc.*, 63 pp.
Philips, Directv, TiVo, DIRECTV Receiver with TiVo Viewer's Guide, 154 pgs.
PocketRemote: Integrating a Universal Remote Control with a Handheld Computer, Angus Huang, Submitted to the Department of Electrical Engineering and Computer Science, Feb. 1, 2002, 2002 Angus Huang, 106 pgs.
RCA, Tivo Viewer's Guide, 1999, 2000 by TiVo, Inc., 96 pgs.
*ROKU, Inc.* v. *UEI, Inc.*, U.S. Pat. No. 10,600,317, Declaration of Margaret Schmidt, 7 pgs.
Sony, 2001 Home Network Products, SVR-2000 Digital Network Recorder, 2001 Sony Electronics Inc., 6 pgs.
Sony, 3-060-082-01 (1 ), Digital Network Recorder SVR-2000, Setup Guide, 2000 by Sony Corporation, Sunnyvale, CA, 94089, http://www.tivo.com, 68 pgs.
Sony, Digital Network Recorder, Installation Guide, SVR-3000, 2002 by Sony Electronics Inc., 58 pgs.
The Essential Guide to User Interface Design, Second Edition, An Introduction to GUI Design Principles and Techniques, Wilbert O. Galilz, Whiley Computer Publishing, John Wiley & Sons, Inc., 2002, 786 pgs. (Uploaded in eight parts).
User Interface—Infrared Learner {Remote Control), Application Note AN2092, Cypress Semiconductor, Document No. 001-41063, {Nov. 11, 2002), 7 pp.
TiVo Installation Guide—Series 2 Digital Video Recorder, archived by web.archive.org on Aug. 12, 2004, with Affidavit of Elizabeth Rosenberg attached ("TiVo"), 88 pp.
U.S. International Trade Commission, Washington, D.C., In the Matter of Certain Electronic Devices, Including Streaming Players, Televisions, Set Top Boxes, Remote Controllers, and Components Thereof, Inv. No. 337-TA-1200, Initial Determination on Violation of Section 337 and Recommended Determination on Remedy and Bond, 154 pp.
Z—ZiLOG, Z90356 and Z90351, 64KWord Television 50 Controller With Expanded OSD Features, PB000102-1102, Product Brief and Product Block Diagram, 6 pgs., ZiLOG Worldwide Headquarters, San Jose, CA., zservice@zilog.com; www.zilog.com.
Final Office Action from U.S. Appl. No. 17/686,039, dated Oct. 3, 2023, 11 pp.
Non-final Office Action from U.S. Appl. No. 18/229,841, dated Mar. 19, 2024, 6 pp.
Non-final Office Action from U.S. Appl. No. 18/233,192, dated Mar. 21, 2024, 17 pp.
Examination report issued on European patent application No. 11870232.3, dated Dec. 14, 2016, 3 pages.
Examination report issued on European patent application No. 11872554.8, dated Jul. 31, 2018, 5 pages.
Examination report issued on European patent application No. 15796548.4, dated Aug. 16, 2019, 5 pages.
Examination report issued on European patent application No. 16747061.6, dated Apr. 14, 2020, 5 pages.
Examination report issued on European patent application No. 21170794.8, dated Aug. 31, 2022, 3 pages.
Extended European Search Report issued on European Patent Application No. 11870232.3, dated Nov. 19, 2014, 7 pages.
Extended European Search Report issued on European Patent Application No. 11872554.8, dated Feb. 26, 2015, 5 pages.
Extended European Search Report issued on European Patent Application No. 12763258.6, dated Jan. 2, 2014, 7 pages.
Extended European Search Report issued on European Patent Application No. 12763258.6, dated Jul. 28, 2014, 8 pages.
Extended European search report issued on European patent application No. 21170794.8, dated Sep. 20, 2021, 7 pages.
Final Office Action issued in U.S. Appl. No. 17/733,254, dated Jan. 10, 2023, 11 pgs.
Final Office Action issued on U.S. Appl. No. 14/736,909, dated Aug. 16, 2018, 6 pgs.
Ingrid Wickelgren, Apr. 1997, IEEE Spectrum, vol. Apr. 1997, pp. 20-25.
International Preliminary Report on Patentability issued on PCT application No. US/2015/030258, dated Dec. 1, 2016, 7 pages.
Non-Final Office Action issued in U.S. Appl. No. 17/733,254, dated Sep. 27, 2022, 10 pgs.
Non-Final Office Action issued on U.S. Appl. No. 14/736,909, dated Apr. 4, 2018, 11 pages.
Non-Final Office Action issued on U.S. Appl. No. 16/106,831, dated Jul. 25, 2019, 6 pgs.
Non-Final Office Action issued on U.S. Appl. No. 16/596,549, dated Sep. 2, 2020, 7 pgs.
Notice of Final Rejection issued on Korean patent application No. 10-2016-7033626, dated Aug. 6, 2021, 9 pages.
Office Action issued on Brazilian patent application No. BR112014006930.1, 2 pages.
Office Action issued on Brazilian patent application No. BR112014006930.1, 3 pages.
Office Action issued on Chinese patent application No. 201680008875.3, dated Sep. 1, 2020, 22 pages.
Office Action issued on Chinese patent application No. 201680008875.3, 9 pages.
Office action issued on Indian patent application No. 201747027318, dated Apr. 12, 2021, 6 pages.
Office Action issued on Israeli patent application No. 253817, 4 pages.
Office Action issued on Japanese patent application No. 2017-541066, dated Feb. 18, 2020, 18 pages.
Office Action issued on Japanese patent application No. 2017-541066, 18 pages.
Non-final Office Action from U.S. Appl. No. 17/887,624, dated Apr. 5, 2024, 32 pp.
Office Action from EP application No. 21217138.3, dated Mar. 19, 2024, 10 pp.

(56) References Cited

OTHER PUBLICATIONS

Non-final Office Action from U.S. Appl. No. 17/888,602, dated May 21, 2024, 20 pp.
Non-final Office Action from U.S. Appl. No. 17/887,624, dated Aug. 9, 2024, 32 pp.
Final Office Action from U.S. Appl. No. 17/888,602, dated Aug. 9, 2024, 21 pp.
Extended Search Report from European application number 22821119.9, dated Oct. 2, 2024, 13 pp.

SYSTEM AND METHOD FOR CONFIGURING CONTROLLING DEVICE FUNCTIONALITY

RELATED APPLICATION INFORMATION

This application claims the benefit of and is a continuation of U.S. application Ser. No. 17/709,603, filed on Mar. 31, 2022, which application claims the benefit of and is a continuation of U.S. application Ser. No. 17/217,587, filed on Mar. 30, 2021, which application claims the benefit of and is a continuation of U.S. application Ser. No. 15/455,411, filed on Mar. 10, 2017, which application claims the benefit of and is a continuation of U.S. application Ser. No. 15/180,188, filed on Jun. 13, 2016, which application claims the benefit of and is a continuation of U.S. application Ser. No. 14/676,556, filed on Apr. 1, 2015, which application claims the benefit of and is a continuation of U.S. application Ser. No. 13/240,604, filed on Sep. 22, 2011, the disclosures of which are incorporated herein by reference in their entirety.

BACKGROUND

Consumer electronic appliances such as set top boxes for receiving and decoding cable and satellite signals, televisions, DVD players, game systems, etc. are well known in the art, as are the hand held controlling devices, for example remote controls, which may be provided for use in issuing commands to these appliances. Frequently, such controlling devices may be "universal," that is, capable of issuing commands suitable for the control of more than one appliance of differing type and/or manufacture.

Increasingly, the interconnections between consumer appliances such as those mentioned above may take the form of digital interfaces based upon, for example, the High-Definition Multimedia Interface (HDMI) standard. The utilization of such digital interconnections may facilitate the exchange of identity information, commands, and capability data between devices and/or the discovery of system topology, which information may be advantageously used when configuring a controlling device.

SUMMARY OF THE INVENTION

This invention relates generally to systems in which a universal controlling device may be configured for use in conjunction with multiple interconnected consumer electronic appliances. In particular, when the interconnection(s) between appliances take the form of a digital interface such as contemplated for example by the HDMI standard, the additional features and functionality of such an interconnection arrangement may be advantageously utilized during configuration and operation of a controlling device associated with that system. The capabilities of individual appliances may be discovered, assessed, and control methods adjusted accordingly, for example substituting direct digital commands issued over the interconnecting bus for wireless infrared or RF command transmissions from a portable controlling device where appropriate. System topologies (e.g., which outputs of which appliance are connected to which inputs of which other appliance(s)) may be established via direct interrogation or by monitoring of digital status during setup, and applied thereafter to the configuration of controlling device and appliance functionality, etc.

In an exemplary embodiment presented herein by way of illustration, such digital discovery, command substitution, and topology determination methods are applied to the configuration of a "home" key on a portable controlling device, where the function of such a key is to return an entertainment system to a known state.

BRIEF DESCRIPTION OF THE DRAWINGS

For a better understanding of the various aspects of the invention, reference may be had to preferred embodiments shown in the attached drawings in which.

DETAILED DESCRIPTION

Figure 1:
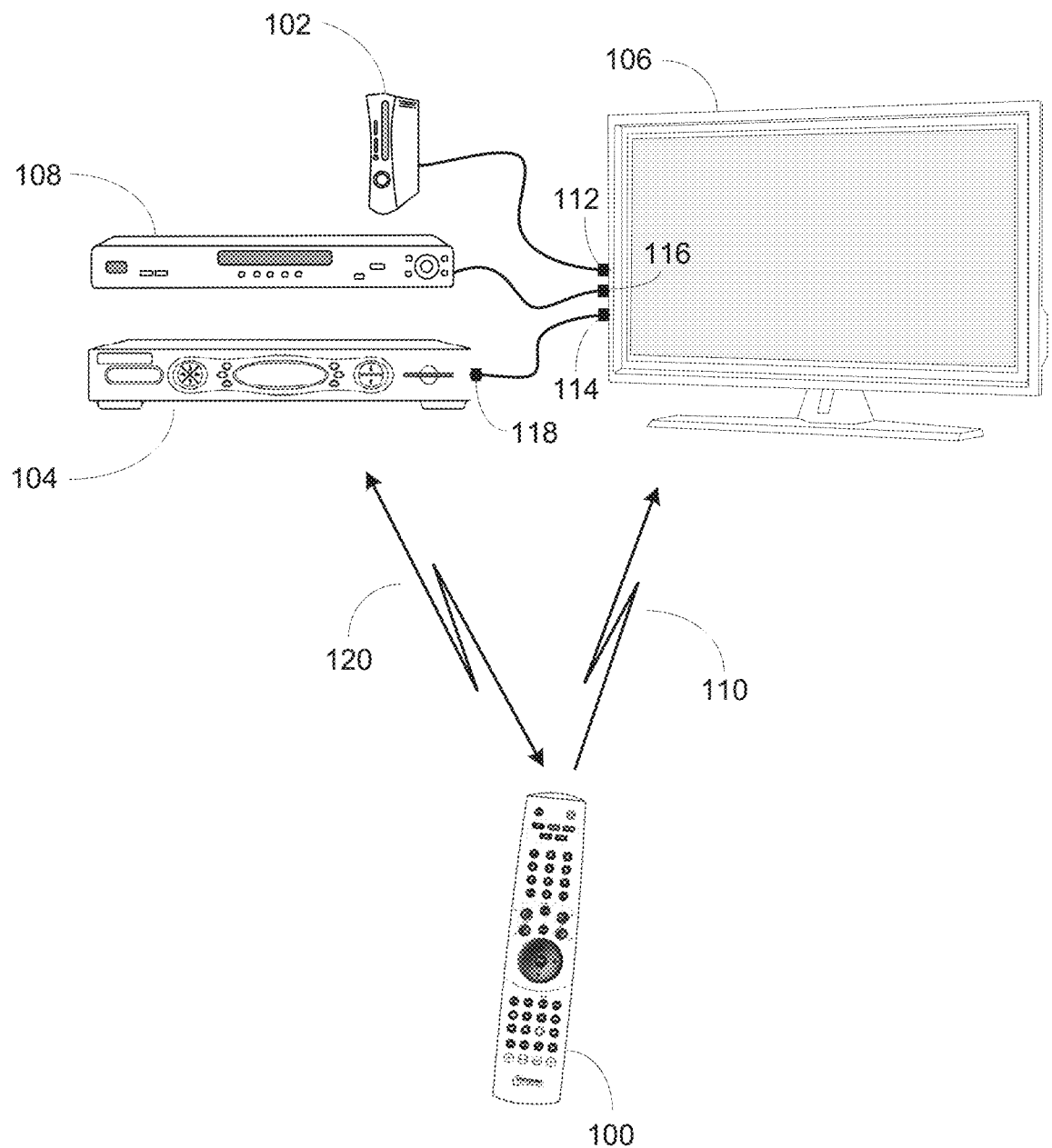
FIG. 1 illustrates an exemplary system in which a controlling device and a set top box configured in accordance with the instant invention may be utilized.

Turning now to FIG. 1, an exemplary system is illustrated wherein a controlling device 100 is configurable to control various appliances, such as a set top box ("STB") 104, a television 106, a DVD player 108, and/or a game console 102. As illustrated, the digital audio/video outputs of appliances 102, 104 and 108, for example output 118 of STB 104, may be attached to digital inputs 112, 114 and 116 of TV 106 in accordance with, for example, the HDMI standard. As is known in the art, the controlling device 100 may be capable of transmitting commands to the appliances, using any convenient IR, RF, Point-to-Point, or networked protocol, to cause the appliances to perform operational functions. Such transmission protocols may be unidirectional 110 or bidirectional 120 as appropriate for the particular appliance to be controlled. In a preferred embodiment, communication between controlling device 100 and at least one of the appliances, e.g., STB 104, comprises a bidirectional link 120.

Figure 2:
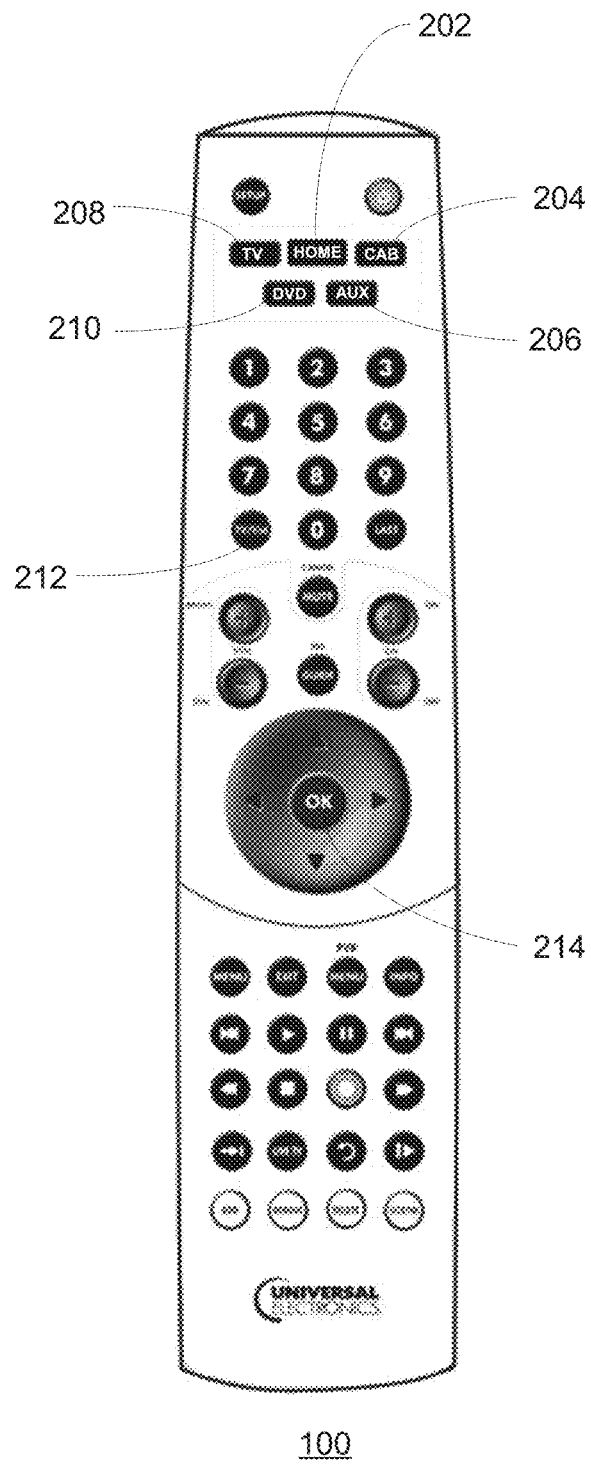
FIG. 2 further illustrates the exemplary controlling device of the system of FIG. 1.

With reference to FIG. 2, an exemplary controlling device 100 may include, inter alia, keys 204 through 210 for selection of an appliance to be controlled, a key 212 or keys for issuing commands to change the active input of a selected appliance, a "select" or "OK" key 214, and a "home" key 202 which may be configured to issue a command or commands intended to restore an appliance to a known state.

Figure 3:
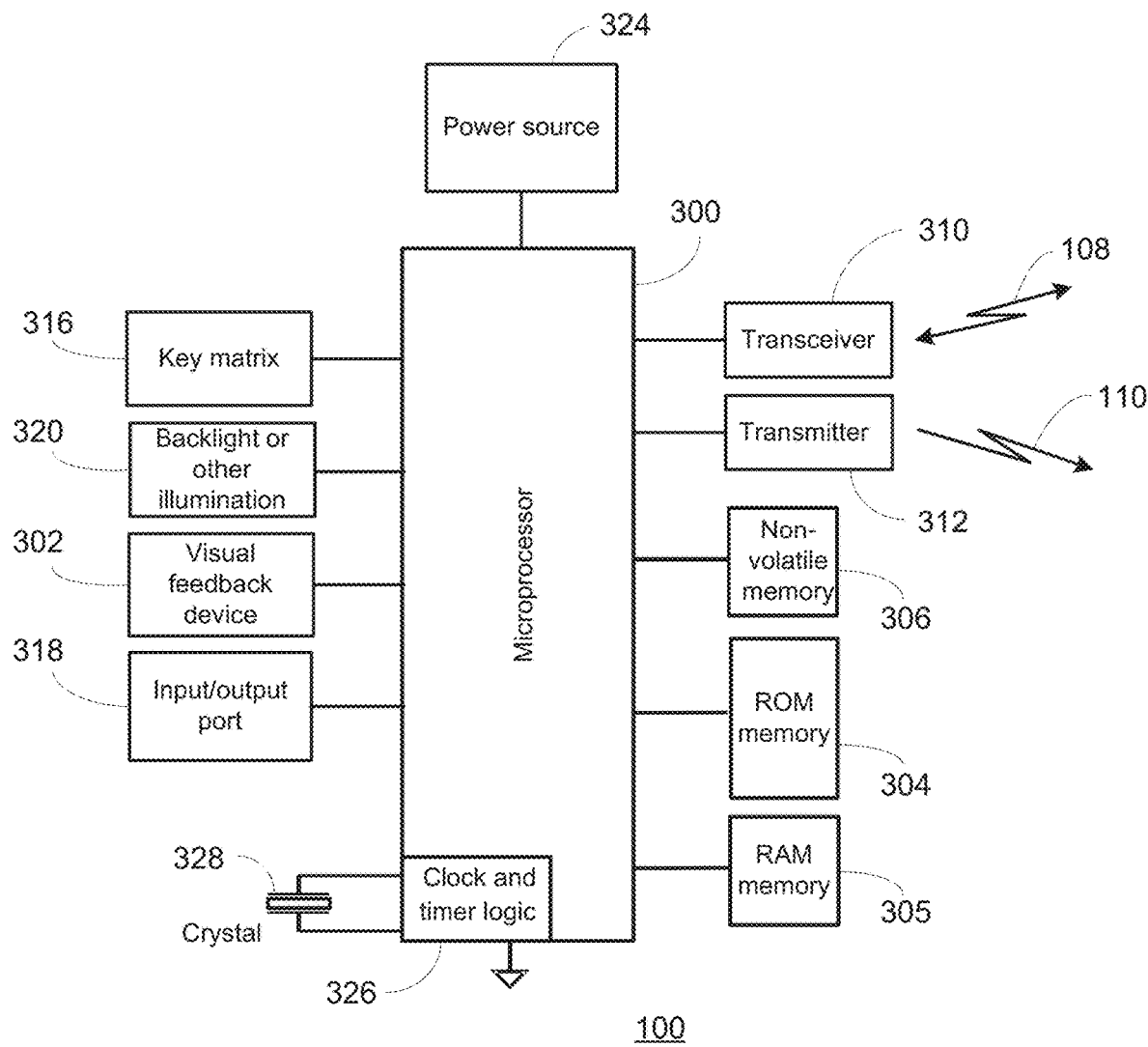
FIG. 3 illustrates a block diagram of exemplary components of the exemplary controlling device of FIG. 1.

Turning now to FIG. 3, for use in commanding the functional operations of one or more appliances an exemplary controlling device 100 may include a processor 300 coupled to a ROM memory 304, a RAM memory 305, a key matrix 316 (e.g., hard keys, soft keys such as a touch sensitive surface overlaid on a liquid crystal (LCD), transmitter circuit(s) 312 and/or transceiver circuit(s) 310 (it being appreciated that elements 310 and 312 may comprise one or more than one transceiver or transmitter, and may utilize IR and/or RF signaling, in any combination as appropriate for a particular embodiment), clock and timer logic 326 with associated crystal or resonator 328, a power source 324 such as a battery, a non-volatile read/write memory 306 such as Flash, battery backed up SRAM, etc., and as required for a particular embodiment means 302 to provide feedback to the user (e.g., one or more LEDs, display, speaker, and/or the like), an input/output port 318 such as a serial interface, USB port, modem, Zigbee, WiFi, or Bluetooth transceiver, etc., and means 320 for backlighting a LCD display or keypad.

As will be understood by those skilled in the art, some or all of the memories 304, 305, 306 may include executable instructions that are intended to be executed by the processor 300 to control the operation of controlling device 100, as well as data which serves to define to the operational software the necessary control protocols and command values for use in transmitting command signals to controllable appliances (collectively, the command data). In this manner, the processor 300 may be programmed to control the various electronic components within the controlling device 100, e.g., to monitor the key matrix 316, to cause the transmission of signals, etc. The non-volatile read/write memory 306, for example an EEPROM, battery-backed up RAM, FLASH, Smart Card, memory stick, or the like type of non-transitory, readable media, may additionally be provided to store setup data and parameters as necessary. While the memory 304 is illustrated and described as a ROM memory, memory 304 can also be comprised of any type of readable media, such as ROM, FLASH, EEPROM, or the like type of non-transitory, readable media. Preferably, read/write memories 304 and 305 are non-volatile or battery-backed such that data is not required to be reloaded after battery changes. In addition, the memories 304, 305 and 306 may take the form of a chip, a hard disk, a magnetic disk, an optical disk, and/or the like. Still further, it will be appreciated that some or all of the illustrated memory devices may be physically combined (for example, a single FLASH memory may be logically partitioned into different portions to support the functionality of memories 304 and 306 respectively), and/or may be physically incorporated within the same IC chip as the microprocessor 300 (a so called "microcontroller") and, as such, they are shown separately in FIG. 3 only for the sake of clarity.

To cause the controlling device 100 to perform an action, the controlling device 100 may be adapted to be responsive to events, such as a sensed user interaction with the key matrix 316, detection of a triggering event via an appropriate trigger sensor, etc. In response to an event, appropriate instructions within the program memory (hereafter the "controlling device operating program") may be executed. For example, when a function key is actuated on controlling device 100, the controlling device operating program may retrieve from the command data stored in memory 304, 305, 306 a command value and transmission protocol corresponding to the actuated function key and, where necessary, current device mode, and transmit that command to an intended target appliance, e.g., TV 106 or STB 104, in a format recognizable by that appliance to thereby control one or more functional operations of that appliance. It will be appreciated that the operating program can be used not only to cause the transmission of commands and/or data to the appliances, but also to perform other operations. While not limiting, other operations that may be performed by the controlling device 100 may include displaying information/data, favorite channel setup, macro key setup, function key relocation, etc. Examples of local operations may be found in U.S. Pat. Nos. 5,481,256, 5,959,751, and 6,014,092. Further, in an exemplary embodiment certain operations may comprise interactions with an appliance such as STB 104 via bidirectional communication link 120, as will be described in greater detail hereafter.

In an exemplary embodiment, controlling device 100 may be universal, that is, adaptable to issue commands to a multiplicity of appliances of different type and/or manufacture. In such cases, for selecting a set of command data to be associated with an appliance to be controlled, data may be provided to the controlling device 100 that serves to identify an intended target appliance by its type and make (and sometimes model). Such data allows the controlling device 100 to identify the appropriate command data and transmission protocol within a preprogrammed library of command data that is to be used to transmit recognizable commands in a format appropriate for such identified appliances (hereafter a "codeset"). As is known in the art, identification of an appropriate codeset may comprise entry of a numeric setup code obtained, for example, from a printed list of manufacturer names and/or models with corresponding code numbers or from a support Web site; may comprise an interaction with an appliance such as STB 104 which culminates in the downloading of command data and/or numeric setup codes to the controlling device; may comprise scanning of bar codes or RFID tags; etc. Since such methods for setting up a controlling device to command the operation of specific home appliances are well-known, these will not be described in greater detail herein. Nevertheless, for additional information pertaining to setup procedures, the reader may turn, for example, to U.S. Pat. Nos. 4,959,810, 5,614,906, 6,225,938, or 7,969,514 all of like assignee and incorporated herein by reference in their entirety.

Figure 4:
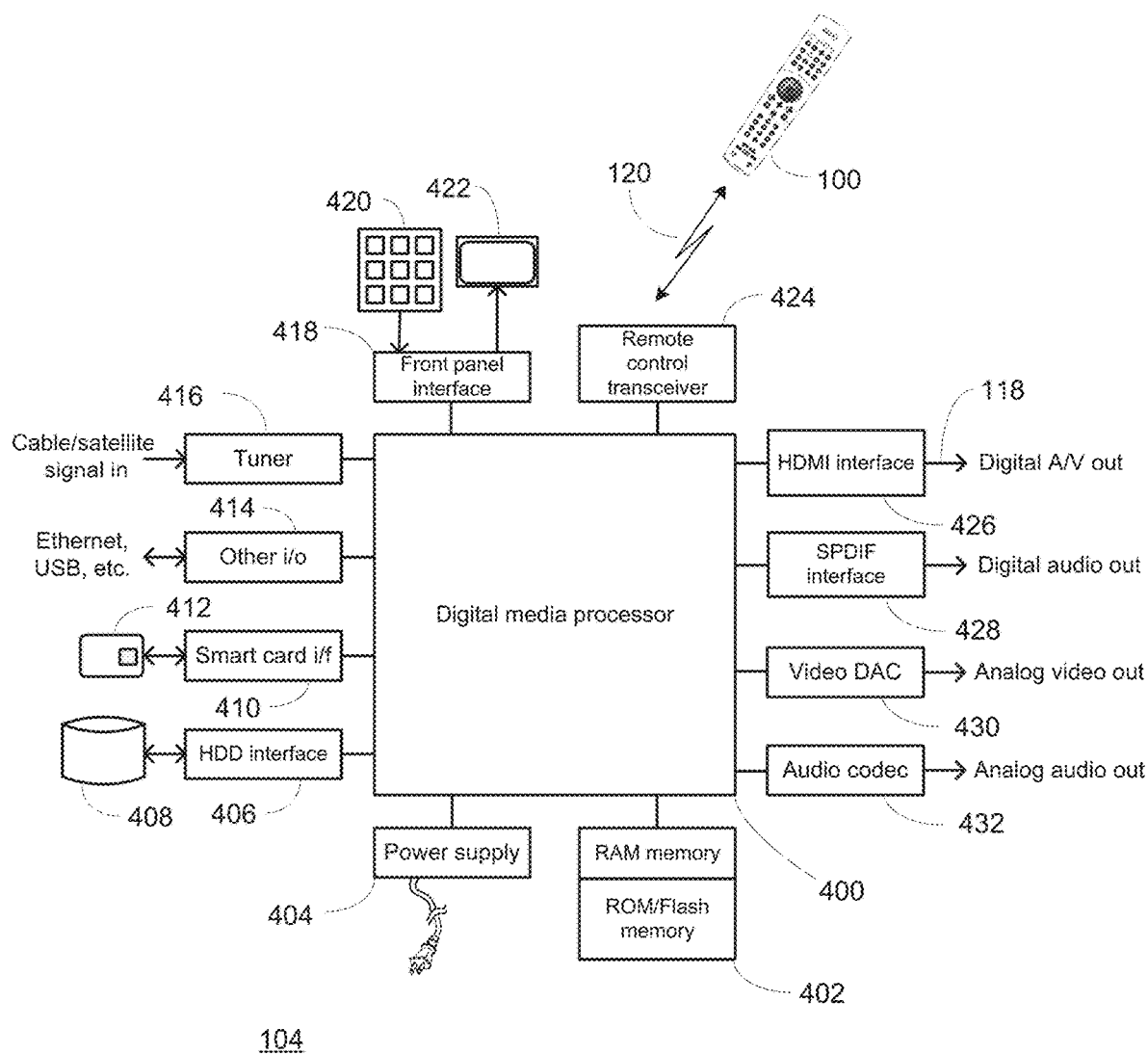
FIG. 4 illustrates a block diagram of exemplary components of the exemplary set top box of FIG. 1.

Turning now to FIG. 4, an exemplary controllable appliance, e.g., STB 104, may include, as needed for a particular application, a processor 400 coupled to a memory 402 which may comprise RAM, ROM, and/or Flash memory; a power supply 404; a hard disk (HDD) interface 406 and associated disk drive 408, for example to support DVR functionality; a smart card and/or PCMIA interface 410 where required to accommodate service enablement/decryption cards 412; other input/output interfaces 414 such as USB, Ethernet, etc.; a front panel interface 418 with associated front panel keypad 420 and display means 422; a remote control receiver or transceiver 424 for reception of signal from a controlling device 100; a digital audio/video output interface 426 such as an HDMI port; a digital audio output 432 such as an SPDIF connection; analog video and audio outputs 430,432; and one or more tuners 416 for receiving and demodulating a cable or satellite signal. As will be appreciated, in general tuner 416 may be capable of receiving both one or more digital media streams comprising program content and a so called out-of-band data stream comprising, for example, program guide information, software updates, etc.

As is known in the art, programming instructions may be stored in a non-transitory readable memory 402 ("STB programming") which when executed by processor 400 may enable the STB appliance 104 to receive and decode digital media and data streams from tuner 416; to store received media content and data on HDD 408 or in memory 402; to output received (from tuner 416) or retrieved (from HDD 408) media content via one or more of the output ports 426,428; to monitor other I/O ports 414 for activity; to receive, decode, and act upon user commands received from controlling device 100 or input via front panel 420; to display program guide information, listings of stored content, or setup and configuration menus at user request and act upon any resulting user input; etc.

Connection of HDMI interface 426 of STB 104 to a compatible appliance such as TV 106 as illustrated in FIG. 1 may enable exchange of digital information between these appliances in accordance with, for example, the Extended Display Identification Data (EDID), Consumer Electronics Control (CEC), and/or High-bandwidth Digital Content Protection (HDCP) standards. By way of explanation, EDID defines data which may be provided by a digital display appliance such as TV 106 to a video source such as STB 104 to characterize the capabilities and configuration of the display device; CEC defines methods by which appliances may exchange command and control information over an HDMI link; and HDCP provides a method for appliances to authenticate one another and exchange encryption keys in order to effect secure transmission of digital AV media content. Since all of these standards are readily available from their respective standards-setting bodies, for the sake of brevity the features and functionality thereof will be further presented herein only to the extent necessary for a complete understanding of the instant invention.

In a system such as that illustrated in FIG. 1 in which various appliances may be digitally interconnected in accordance with a standard such as HDMI, an appliance, for example STB 104, may utilize information obtainable via such an interconnection to cooperatively participate in the configuration of a universal controlling device such as controller 100. Such cooperation may comprise communication of identifying information regarding the interconnected other appliances to the controlling device, as described for example in co-pending U.S. patent application Ser. No. 12/716,635, of like ownership and incorporated herein by reference in its entirety. Alternatively or in conjunction with such setup, an appliance such as STB 104 may also engage in cooperative determination of system topology and configuration of controlling device features as described herein.

By way of example and without limitation, in an illustrative embodiment of such system topology determination and controlling device configuration it may be considered advantageous for a controlling device 100 offered in conjunction with a STB 104 to be provisioned with a "home" key 202, activation of which may serve to command TV 106 to select as its active input that port which is connected to STB 104, e.g., port 114 in the illustrative example. Provision of such a feature may enable a user who has inadvertently switched TV 106 to a different input source to immediately restore the source to the STB display. While the illustrative example presented herein is in the context of a "home" key 202 which may be specifically provisioned for this purpose, in other embodiments such functionality may be equally advantageously offered in conjunction with an existing appliance selection key such as "Cable" 204 or "DVD" 210, i.e. activation of key 204 may not only place controlling device 100 into an operating mode suitable for controlling STB 104, but may also command TV 106 to select that input port which is associated with viewing STB-sourced content, i.e. port 114; activation of key 210 may not only place controlling device 100 into an operating mode suitable for controlling DVD player 108, but may also command TV 106 to select that input port which is associated with viewing DVD-sourced content, i.e. port 116; etc. Accordingly it will be appreciated that while the methods described below are presented by way of illustration in terms of enabling a "home' 202, such methods may be applied, mutatis mutandis, to the provision of similar functionality to any suitable key of a controlling device. In order to enable such a feature, however, it must first be determined which one of TV inputs 112, 114, 116 is connected to STB 104, and then determine which explicit input select command, either within the CEC repertoire or within the controlling device codeset applicable to TV 106, may command direct selection of that specific input in order that the controlling device 100 may be configured such that actuation of "home" key 202 may cause an appropriate command to be issued to TV 106.

Accordingly, after controlling device 100 has been initially configured to command operation of appliances 102 through 108, preferably in conjunction with STB 104 as described for example in the above referenced U.S. Pat. No. 7,969,514 or in U.S. patent application Ser. No. 12/716,635, in an exemplary embodiment the STB programming of appliance 104 and the controlling device operating program of controlling device 100 may cooperatively execute a series of steps to configure the functionality of "home" key 202, coordinated where necessary over bidirectional communication link 120, as will now be described in conjunction with FIGS. 5 and 6.

Figure 5:
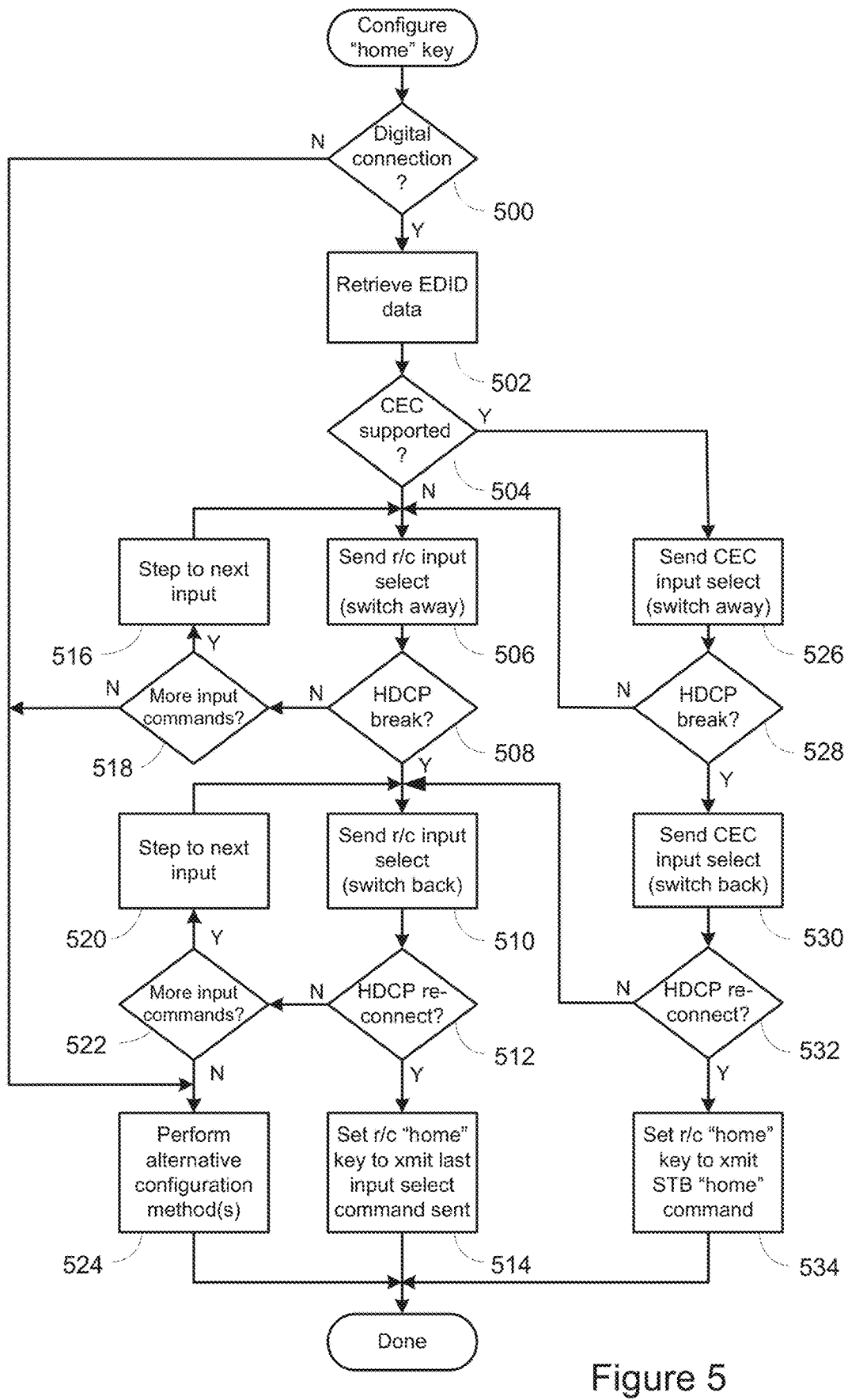
FIG. 5 illustrates an exemplary series of steps which may be performed when configuring the controlling device of FIG. 1.

With reference to FIG. 5, at step 500 the STB programming may initially determine if a display appliance, e.g., TV 106, is in fact connected to HDMI port 118. If not, retrieval of HDMI-available digital information from the appliance may not be possible, and accordingly the configuration process may continue at step 524 whereat other configuration methods may be attempted, for example as described hereafter in conjunction with FIG. 6. If however an appliance is determined to be connected to HDMI port 118, at step 502 that appliance's EDID data may be retrieved. The EDID data may indicate, inter alia, which HDMI port of the connected appliance is being used to communicate with STB 104, e.g., port 114 of TV 106 in the illustrative example. Next, at step 504, the STB programming may determine whether the attached appliance supports CEC control over the HDMI connection. This determination may be made based on information contained in the retrieved EDID, may be empirically derived based on the appliance's response (or lack thereof) to a CEC query, may be obtained by referencing a local or remote database of appliance capabilities using appliance identity information embedded in the EDID or previously gathered during initial setup of controlling device 100, or any other suitable method. If it is determined that the appliance does in fact support CEC control, than at step 526 a CEC command may be issued via the HDMI interconnection to cause the appliance to select a different input as its current AV source. Thereafter, at step 528 the STB programming may determine if an HDCP break has occurred as a result of the command issued at step 526. By way of explanation, whenever a digital pathway is established between an HDCP compliant source device and an HDCP compliant sink device, an authentication process and exchange of encryption keys occurs. Since many sink devices are capable of supporting only one HDCP stream at a time, when sink device inputs are switched the HDCP logical connection with the former source device may be terminated and authentication cancelled. If such an HDCP break is detected, then at step 530 the STB programming may next issue a CEC input select command to return the appliance input to the EDID-indicated HDMI port to which the STB is purportedly connected. Thereafter, at step 532 the STB programming may determine if an HDCP reconnect has occurred as a result of the command issued at step 530. If so, it has been established that the appliance, TV 106 in the illustrative example, may be successfully switched back to the correct input for display of STB output via the use of a CEC command issued over the HDMI interconnection. Accordingly, at step 534 a message may be communicated to controlling device 100 to configure "home" key 202 to transmit a command to STB 104, which command when received by STB 104 will cause issuance of the just-verified CEC input select command to TV 106. As will be appreciated, in some embodiments this may in fact comprise the default configuration for the controlling device "home" key function, in which instances step 534 may be omitted. If either the HDCP break at step 528 or HDCP reconnect at 532 is unsuccessful, it may be assumed that input switching via CEC commands is not adequately supported by the appliance, e.g. TV 106, and as indicated in FIG. 5 the STB programming may continue at an appropriate point in the controlling device input select command test sequence described below.

Returning to step 504, if the STB programming determines that the attached appliance does not support CEC control, at step 508 it may communicate with controlling device 100, for example via bidirectional communication link 120, in order to request transmission of a preparatory input selection command to the attached appliance, e.g., TV 106. Such a preparatory command, transmitted at step 506, may comprise a command to select an input to which the STB 104 is not connected. By way of example, in the illustrative system this may comprise a command intended to cause TV 106 to switch away from the EDID-indicated HDMI port 114 to which STB 104 is connected, e.g., to one of ports 112 or 116. Thereafter, at step 508 the STB programming may determine if an HDCP break has occurred as a result of the command issued at step 506. If not, at steps 518 and 516 other available input selection commands available in the codeset applicable to TV 106 may be sequentially tested. If no command code is successful in initiating and HDCP break, the STB programming may continue at step 524 where alternative configuration methods may be attempted as described hereafter. If however an HDCP break is successfully initiated, at steps 510, 512, 522, 520 the STB programming may next attempt to determine the input select command which will restore TV 106 to the input port 114 to which STB 104 is connected. As illustrated, this may take the form of repetitive requests to controlling device 100 to cause sequential issuance of possible input select command to TV 106 until an HDCP reconnect is detected by the STB programming. Advantageously, the sequence in which input select commands are issued to TV 104 may be determined in part by the HDMI port number reported by TV 106 as part of the EDID data retrieved at step 502. By way of example, if the EDID data indicates that the connection 114 is to HDMI port number three of TV 106 and a command labeled "HDMI 3" is present in the controlling device codeset applicable to TV 106, then that command may be selected as the first to be attempted. When an HDCP reconnect status is detected by the STB programming, at step 514 a message may be communicated to controlling device 100 to configure "home" key 202 to transmit the TV input select command code last issued in the test sequence, and configuration is complete. If however no HDCP reconnect has been detected upon exhaustion of possible input select codes, at step 524 alternative configuration methods may be attempted, for example such at that described hereafter in conjunction with FIG. 6.

Figure 6:
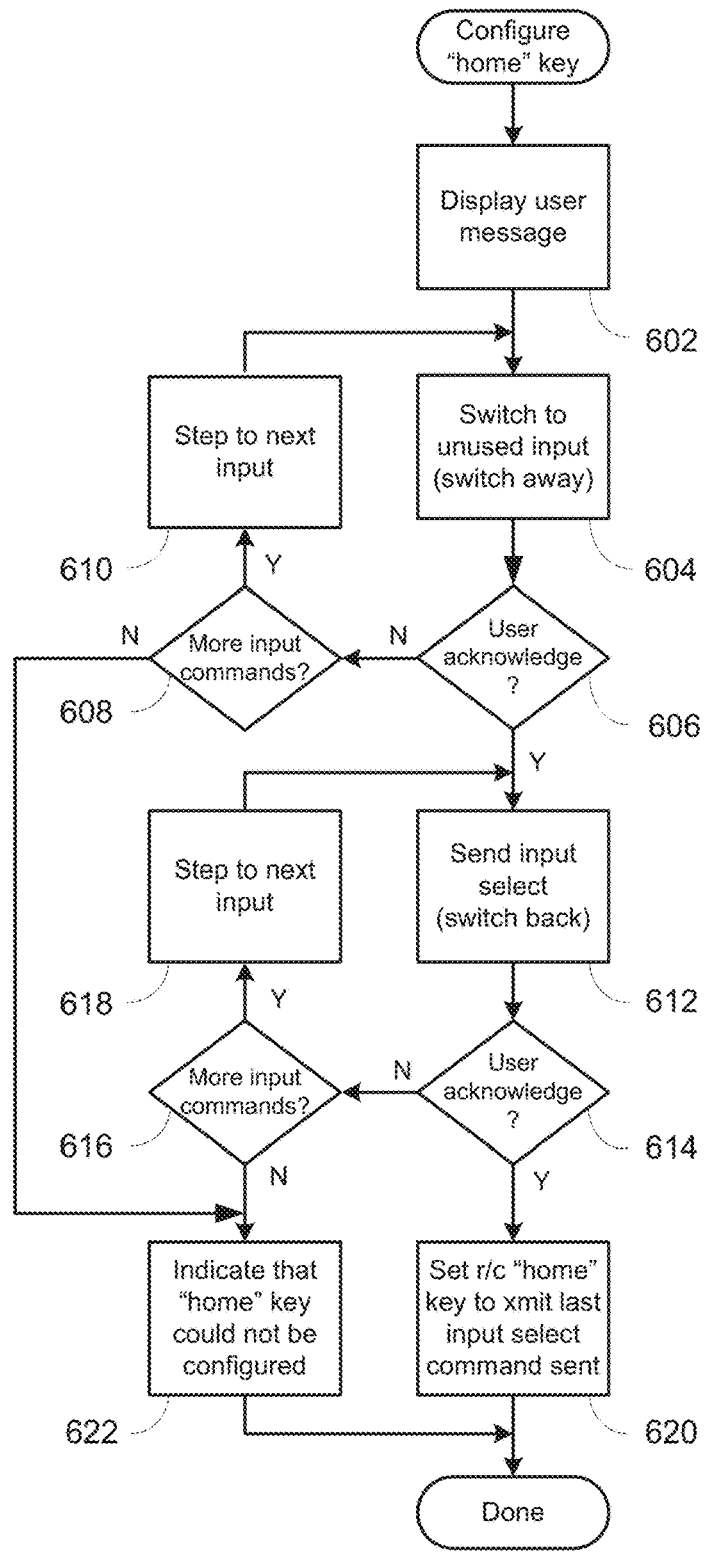
FIG. 6 illustrates a further exemplary series of steps which may be performed when configuring the controlling device of FIG. 1.

In those cases where a display device such as a TV is not attached to an STB via a digital connection, for example is connected to analog AV outputs 430,432 of STB 104; or where a display device is attached via a digital connection but may not be compatible with the methods described above conjunction with FIG. 5, for example a display device which supports multiple concurrent HDCP sessions and accordingly does not reliably report HDCP session termination when an input is switched, an exemplary alternate configuration method will now be described in conjunction with FIG. 6. As will become apparent, in the illustrative method user feedback may be used in lieu of the HDCP status change detections of the previous methods. This process may commence at step 602 with the STB programming causing display of a message on the TV screen which message may prompt the user to take the required actions. For example, in the illustrative method, the message may request that the user actuate the "OK" key 214 of controlling device 100 once when the displayed messages disappears and a second time when the displayed message reappears. Thereafter, at step 604 the STB programming may request that the controlling device 100 issue a command to cause selection of an unused input of the TV device. Advantageously, the particular input command used may be selected from those available in the current codeset in such a manner as to maximize the probability of the selected input being unused. For example in the case of TV 104 which is known to be interconnected via a digital interface, such an input selection command may be one presumed to be associated with an analog input, for example an "antenna" or a "composite video" input selection command. At step 606 it is then determined, after a suitable delay, whether the user has acknowledged disappearance of the displayed message, i.e., the STB has received a controlling device transmission comprising the command associated with "OK" key 214. If not, the sequence is repeated using a different input select command, via steps 608 and 610. Once the user has confirmed in this manner that the selected TV input is no longer that which is connected to the output of the STB, at steps 612 through 618 the STB programming may cause sequential transmission of available input selection commands until a second user acknowledgement is received to indicate that the selected TV input is once again that input which is connected to the STB, as evidenced by reappearance of the displayed message. Again, the order in which input select commands are tested may be advantageously adjusted according to known factors, for example starting with the EIDID indicated port in the case of a digitally attached device; starting with known non-HDMI, non-DVI inputs in the case of an analog attached device; etc. Upon receiving the second user acknowledgement, at step 620 the STB programming may forward an indication to controlling device 100 that the TV input select command code last issued in the test sequence should be assigned to "home" key 202, and configuration is complete. If however a first or second user acknowledgement is not received prior to exhaustion of all possible input selection commands present in the current codeset, then at step 622 an indication may be issued to the user that automatic configuration of the "home" key is not possible. To ensure that it reaches the user regardless of the current state of the TV inputs, such an error indication may comprise, for example, not only an attempted display on the TV screen, but also a message on STB front panel 422, activation of user feedback mechanism 302 of controlling device 100, etc.

While various concepts have been described in detail, it will be appreciated by those skilled in the art that various modifications and alternatives to those concepts could be developed in light of the overall teachings of the disclosure. For example, while the majority of the steps of the exemplary method of FIGS. 5 and 6 are described as performed by the STB programming, it will be appreciated that in other embodiments many of these steps may be equally well performed by the controlling device operating program.

Additionally, while presented by way of illustration in the context of configuration of a "home" key of a universal controlling device, it will be appreciated that the methods described herein may be generally applied to the configuration and operation of digitally interconnected systems of electronic appliances, for example without limitation the configuration of activity-specific operations such as "Watch a movie", "Listen to music", "Browse the web", etc.; the determination of favorite equipment configuration settings and restoration thereto; the capture of individual user preferences; etc.

Further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents cited within this document are hereby incorporated by reference in their entirety.

What is claimed is:

1. A controlling device, comprising:
    a communication interface;
    a processing device coupled to the communication interface; and
    a memory storing instructions executable by the processing device to cause the controlling device to perform steps comprising:
    receiving from a first controllable device via the communication interface a data that identifies a communication port of a second controllable appliance to which the first controllable appliance is communicatively coupled; and
    using the data received from the first controllable device to automatically configure a predetermined input element of the controlling device whereupon a subsequent activation of the predetermined input element of the controlling device will cause a transmission of a command via use of the communication interface for causing the second controllable appliance to make active the communications port of the second controllable appliance to which the first controllable appliance is communicatively coupled.

2. The controlling device as recited in claim 1, wherein the instructions cause the controlling device to be entered into a setup mode for configuring the predetermined input element of the controlling device prior to using the data received from the first controllable device to automatically configure the predetermined input element of the controlling device.

3. The controlling device as recited in claim 2, wherein the controlling device is caused to enter into the setup mode for configuring the predetermined input element of the controlling device in response to receiving an instruction via the communication interface from the first controllable appliance.

4. The controlling device as recited in claim 3, wherein the predetermined input element of the controlling device comprises a hard key.

5. The controlling device as recited in claim 3, wherein the predetermined input element of the controlling device comprises a soft key.

6. The controlling device as recited in claim 1, wherein the communication interface comprises a radio frequency interface.

7. The controlling device as recited in claim 1, wherein the communication interface comprises an infrared interface.

8. A method, performed by a controlling device, comprising:
    receiving from a first controllable device via a communication interface of the controlling device a data that identifies a communications port of a second controllable appliance to which the first controllable appliance is communicatively coupled; and
    using the data received from the first controllable device to automatically configure a predetermined input element of the controlling device whereupon a subsequent activation of the predetermined input element of the controlling device will cause a transmission of a command via use of the communication interface for causing the second controllable appliance to make active the communications port of the second controllable appliance to which the first controllable appliance is communicatively coupled.

9. The method as recited in claim 8, comprising causing the controlling device to be entered into a setup mode for configuring the predetermined input element of the controlling device prior to using the data received from the first controllable device to automatically configure the predetermined input element of the controlling device.

10. The method as recited in claim 9, comprising causing the controlling device to enter into the setup mode for configuring the predetermined input element of the controlling device in response to receiving an instruction via the communication interface from the first controllable appliance.

11. The method as recited in claim 10, wherein the predetermined input element of the controlling device comprises a hard key.

12. The method as recited in claim 10, wherein the predetermined input element of the controlling device comprises a soft key.

13. The method as recited in claim 8, wherein the communication interface comprises a radio frequency interface.

14. The method as recited in claim 8, wherein the communication interface comprises an infrared interface.

15. A system, comprising:
    a first controllable appliance;
    a second controllable appliance communicatively coupled to the first controllable appliance; and
    a controlling device, comprising:
    a communication interface;
    a processing device coupled to the communication interface; and
    a memory storing instructions executable by the processing device to cause the controlling device to perform steps comprising:
    receiving from the first controllable device via the communication interface a data that identifies a communication port of the second controllable appliance to which the first controllable appliance is communicatively coupled; and using the data received from the first controllable device to automatically configure a predetermined input element of the controlling device whereupon a subsequent activation of the predetermined input element of the controlling device will cause a transmission of a command via use of the communication interface for causing the second controllable appliance to make active the communications port of the second controllable appliance to which the first controllable appliance is communicatively coupled.

16. The system as recited in claim 15, wherein the instructions cause the controlling device to be entered into a setup mode for configuring the predetermined input element of the controlling device prior to using the data received from the first controllable device to automatically configure the predetermined input element of the controlling device.

17. The system as recited in claim 16, wherein the controlling device is caused to enter into the setup mode for configuring the predetermined input element of the controlling device in response to receiving an instruction via the communication interface from the first controllable appliance.

18. The system as recited in claim 17, wherein the predetermined input element of the controlling device comprises a hard key.

19. The system as recited in claim 17, wherein the predetermined input element of the controlling device comprises a soft key.

20. The system as recited in claim 15, wherein the communication interface comprises a radio frequency interface.

21. The system as recited in claim 15, wherein the communication interface comprises an infrared interface.

* * * * *